R. FULLER.
ELECTRIC MOTOR CONTROL.
APPLICATION FILED SEPT. 9, 1908.
994,993.
Patented June 13, 1911.
2 SHEETS—SHEET 1.
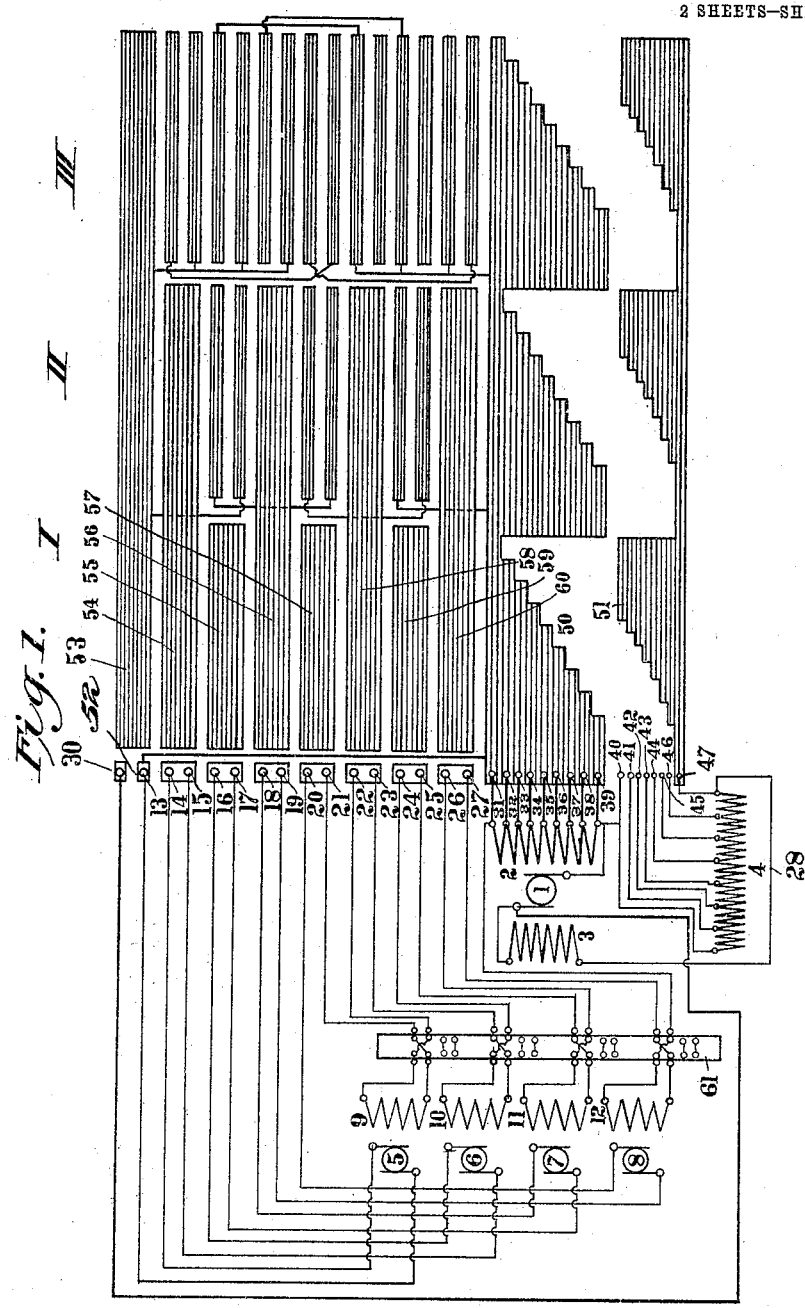
WITNESSES:
Walter A. Greenburg
A. M. Dorr
INVENTOR
Rodolphus Fuller
BY 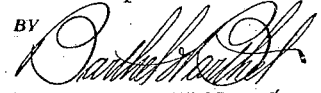
ATTORNEYS

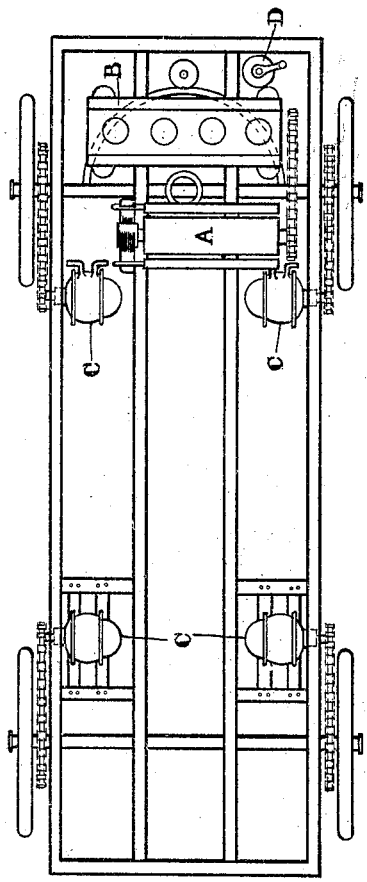

UNITED STATES PATENT OFFICE.

RODOLPHUS FULLER, OF DETROIT, MICHIGAN.

ELECTRIC-MOTOR CONTROL.

994,998.

Specification of Letters Patent.   Patented June 13, 1911.

Application filed September 9, 1908.   Serial No. 452,210.

*To all whom it may concern:*

Be it known that I, RODOLPHUS FULLER, a citizen of the United States of America, residing at Detroit, in the county of Wayne and State of Michigan, have invented certain new and useful Improvements in Electric-Motor Control, of which the following is a specification, reference being had therein to the accompanying drawings.

This invention relates to a system of electric motor control which is capable of general application in electric power transmission mechanism where great flexibility is required in starting and stopping with heavy loads and it is particularly applicable to the control of electric power trucks, tramways and the like designed for transporting heavy loads and which are driven by electric power generated on the vehicle itself and transmitted to the wheels of the vehicle through independent motors in suitable driving connection therewith.

My invention involves the use of a special generator driven at a constant speed by an internal combustion engine or other prime mover and adapted to operate the motors at various power output and a controlling switch arranged to increase or decrease the E. M. F. of the generator with each connection in a manner adapted to produce the highest efficiency of the motors in stopping, starting or accelerating the vehicle and afford the driver absolute control over the same all as more fully hereinafter described and shown in the accompanying drawings.

Figure 1 represents my invention in diagrammatic form as arranged for four motors, and Fig. 2 represents in plan its application to a truck, the electrical connections being omitted.

1 indicates the armature, 2 the series field winding, 3 the shunt field winding, and 4 an external resistance in the shunt circuit 28 of the generator A, the generator being intended to be driven by an internal combustion engine or other prime mover B adapted to drive the same at a constant speed.

5, 6, 7 and 8 represent the armatures and 9, 10, 11 and 12 represent the field windings of four series motors C intended to be supplied with current from the generator and supposed to be in suitable drive connection with the four wheels of the vehicle.

13 to 19 represent a series of fixed contact fingers in electrical connection with the motor armatures, 20 to 27 represent a like series of fixed contact fingers electrically connected with the terminals of the field windings of the electrical motors.

30 represents a fixed contact finger forming one of the terminals of the main circuit of the generator.

31—39 represent a series of fixed contact fingers electrically connected to different points of the series field winding of the generator, the finger 31 being also electrically connected to the remaining terminal of the motor field winding 12.

40 to 47 represent a series of fixed contact fingers electrically connected with different points of the terminal shunt resistance.

All the above described fixed contact fingers represent the stationary bank of contacts of a controller D which may be of the usual form of a drum controller, having a suitable lever handle for turning it and carrying the movable contact strips with which the fixed contacts are adapted to be variously connected by rotating the drum as in the usual construction of such drum controllers. The arrangement of these movable contacts is as follows:—The contact fingers 31 to 39 coöperate with a movable contact strip 50 which is gradually stepped off three times in succession so that by revolving the drum from the position shown, in the drawing, which represents its initial or "off" position, one after another of the contact fingers is brought out of electrical contact therewith three times in succession with the exception of the contact 31 which always remains in electrical connection therewith. A similar contact strip is arranged to simultaneously coöperate with the contact fingers 40—47 only this contact strip is reversely stepped off so that in rotating the drum from the initial position one after another of these contact fingers is brought into electrical contact with the strip three times in succession.

The contact fingers 31—47 being electrically connected as shown and described, the movement of the controller handle in revolving the drum will therefore in starting from the "off" position gradually cut in the series field winding of the generator and correspondingly cut out the shunt resistance three times in succession and in reversing the handle back to the "off" position the opposite will take place. The contact fingers 14—27 contact in the initial position with suitable contacts on the drum to conect the armatures and fields of the four motors in series with each other and as there is also a contact 52 on the drum for the fixed contact 13 which is electrically connected with the strip 50, the motors will be short circuited upon themselves in the initial position, the generator being disconnected and closed through the shunt circuit. By making the shunt resistance equal to the shunt field winding the voltage of the generator will be then at zero while running at its normal speed. The connection of the motors into the generator circuit is effected in the usual manner by means of contact strips 53—60 on the controller, these contact strips being electrically divided into three groups I, II, III, the group I effecting the connection thereof in series, group II in parallel series and group III in parallel, all of which is well understood.

The parts being arranged and constructed as shown and described they are intended to operate as follows:—In the "off" position as shown in the drawings the motors are short circuited upon themselves and if the vehicle should be going down hill and in stopping they will therefore assist the action of the brakes. In revolving the drum from this "off" position the motors will be connected into the generator circuit and during the first third of the revolution the connection will be in series, during the second third it will be in series parallel and during the remainder it will be in parallel. At the same time it will be seen that as each connection is made the voltage of the generator is at zero and only gradually increases to its maximum by the gradual cutting in of the field winding of the generator and the gradual cutting out of the shunt resistance and before and during the change from one connection to another the generator drops back to zero voltage. By revolving the drum thus to the end of its first running position the maximum torque is obtained for starting and after turning it to the end of its third running position the maximum acceleration is obtained. It is obvious that the connection in parallel series may be omitted without changing the scope of the invention. In order to reverse the motion of the vehicle, a reversing switch 61 is placed in the motor connections, the operation of which is well understood.

What I claim as my invention is:—

1. The combination with a plurality of series motors utilized for vehicular propulsion, of a generator driven at a constant speed by a prime mover on the vehicle itself and provided with series and shunt field windings, an external resistance in the generator shunt, and a controlling switch having contacts and connections adapted to successively connect the motors in different circuit relations with the main circuit of the generator in moving the controller from its off position to its full speed position, and to maintain each of such connections for a portion of its travel into such position, and other contacts and connections adapted to gradually cut in the series field winding of the generator and correspondingly cut out the shunt resistance for each portion of such travel.

2. The combination with a plurality of series motors, of a generator provided with a series field winding and with a shunt field winding which is always in circuit, an external resistance in said shunt circuit, and a controlling switch having contacts and connections adapted to short circuit the motors in series with themselves in its off position and to connect them in different circuit relations with the main circuit of the generator when said controller is moved from said position to its full speed position, the controller being adapted to maintain each of said connections for a portion of its travel and other contacts and connections adapted to gradually cut in the series field winding of the generator and correspondingly cut out the shunt resistance for each such portion of its travel.

3. The combination with a plurality of series motors, of a generator driven at a constant speed and provided with a graduated series field winding and with a shunt field winding which is always in circuit, an external graduated resistance in said shunt circuit equal to the shunt field winding and a controlling switch having constant end connections adapted to short circuit the motors in series on themselves in the off positions of the controller and to successively connect the motors in different circuit relations with the main circuit of the generator in moving it from said position to its remote full speed position, the controller being adapted to maintain each of said connections for a portion of its travel, and other contacts and connections adapted to gradually cut in the series field winding and correspondingly cut out the shunt resistance for each such portion of its travel.

4. The combination with a plurality of series motors, of an engine driven generator having both shunt and series field windings, an external resistance in the shunt equal to said shunt field winding, and a controlling switch having contacts and connections adapted to connect the motors in circuit with themselves in its off position and to successively connect the motors in different circuit relations with the main circuit of the generator when moved from its off position to its full speed position, the controller being adapted to maintain each of said connections for a portion of its travel, and other contacts and connections adapted to first gradually cut in the series field windings and correspondingly cut out the shunt resistance and then cut out the series field winding and correspondingly cut in the shunt resistance for each such portions of its travel.

5. The combination with a plurality of series motors, of an engine driven generator having a graduated series field winding and a constantly closed shunt circuit provided with a shunt field winding and an external graduated resistance equal to the shunt field winding, and a series parallel controller having contacts and connections adapted to connect the motor elements in different circuit relations with the main circuit of the generator in moving the controller from its off position through successive steps to a position remote therefrom and to gradually increase the output of the generator from zero voltage to its maximum on passing through each of said steps and to maintain said voltage at zero while passing through the position intermediate said steps and in the off position of the controller with the generator running at its normal speed.

In testimony whereof I affix my signature in presence of two witnesses.

RODOLPHUS FULLER.

Witnesses:
OTTO F. BARTHEL,
C. R. STICKNEY.